J. BUCHTEL.
Photographic Plate-Holders.
No. 134,512.  Patented Jan. 7, 1873.
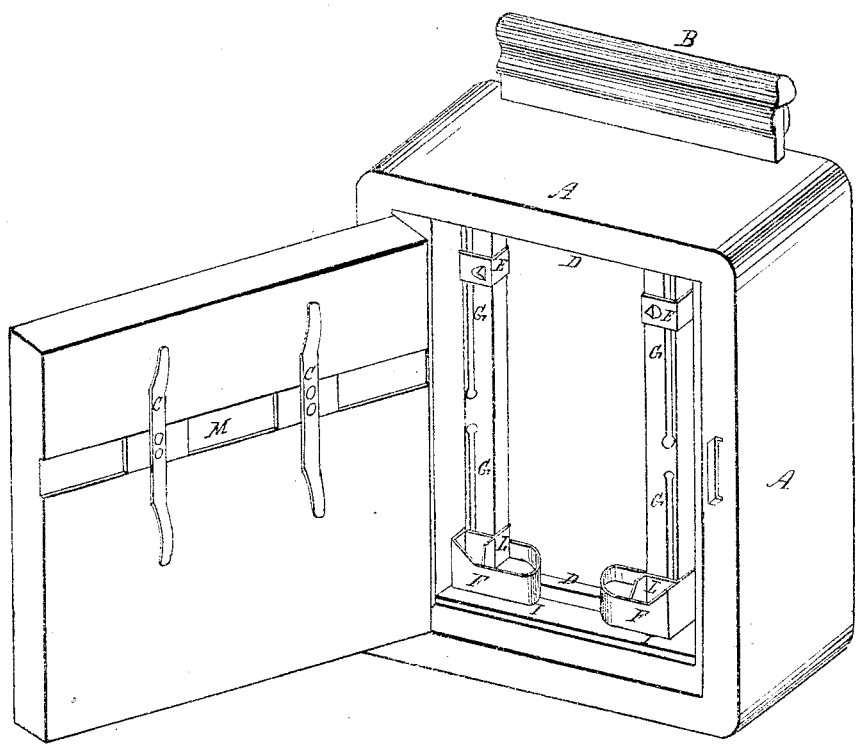
Witnesses  
C. B. Talbot  
Carl Bosco
Inventor  
Joseph Buchtel

UNITED STATES PATENT OFFICE.

JOSEPH BUCHTEL, OF PORTLAND, OREGON.

IMPROVEMENT IN PHOTOGRAPHIC-PLATE HOLDERS.

Specification forming part of Letters Patent No. 134,512, dated January 7, 1873.

*To all whom it may concern:*

Be it known that I, JOSEPH BUCHTEL, of Portland, in the county of Multnomah and State of Oregon, have invented certain Improvements in Photographic-Plate Holders, of which the following is a specification:

The object of the present invention is to simplify and otherwise improve the subject of Letters Patent No. 93,669, dated August 17, 1869.

The principal features of improvement are set forth in the drawing, where G G are the uprights supporting the cups F F and bearing-points E E, with the springs C C, movable in the dovetail-guide M across the door of the holder. Two long slots are cut through each of the pieces G, forming the springs for cups F and points E. The springs C on the door, pressing on the glass supported in the cups F and on the points E, press the pieces G against the rabbets D in the back of the holder, the pieces G not sliding on ways, as formerly, making it much easier to keep clean.

By making the springs of the pieces G obviates the necessity of attaching any spring material to the cups F, thereby making them much easier. Where cups were made of glass or other rigid material it was found to be important to make them in the manner for use on springs as herein shown.

By having the springs C movable across the door it is found that the points of pressure on the glass are much nearer the bearing-points than by the old method of pressure in the middle alone, this middle pressure sometimes warping thin glass or plates out of focus; but by pressing them at the corners all this is avoided. For large plates longer springs are used; but all are made to fit in the dovetail-groove M.

The cups F are made somewhat similar to former ones, with the exception of the bearing-place for the plate, shown by the letter L. These are made a little wider at the bottom than at the top, and continue almost to the bottom of the cup.

*Claims.*

I claim—

1. The slotted pieces G, supporting-points E, retaining-cups F, with the bearings L, same being movable vertically and laterally, so made as to be adjustable to varying sizes of plates.

2. The movable springs C working in a slot, M, as shown, the whole substantially as described, and for the purpose set forth.

JOSEPH BUCHTEL.

Witnesses:
C. B. TALBOT,
CARL BOSEO.